(12) United States Patent
Okadome et al.

(10) Patent No.: US 11,435,706 B2
(45) Date of Patent: Sep. 6, 2022

(54) CONTROL SYSTEM AND CONTROL METHOD

(71) Applicant: HITACHI, LTD., Tokyo (JP)

(72) Inventors: Yuya Okadome, Tokyo (JP); Wenpeng Wei, Tokyo (JP); Toshiko Aizono, Tokyo (JP)

(73) Assignee: HITACHI, LTD., Tokyo (JP)

( * ) Notice: Subject to any disclaimer, the term of this patent is extended or adjusted under 35 U.S.C. 154(b) by 1046 days.

(21) Appl. No.: 16/112,976

(22) Filed: Aug. 27, 2018

(65) Prior Publication Data
US 2019/0121303 A1 Apr. 25, 2019

(30) Foreign Application Priority Data
Oct. 23, 2017 (JP) .............................. JP2017-204158

(51) Int. Cl.
*G05B 13/04* (2006.01)
*G05B 13/02* (2006.01)
(Continued)

(52) U.S. Cl.
CPC ......... *G05B 13/04* (2013.01); *G05B 13/0265* (2013.01); *H04R 1/028* (2013.01);
(Continued)

(58) Field of Classification Search
CPC ...... G05B 13/04; G05B 13/0265; G06N 3/08; H04R 1/028; H04R 3/00; H04R 2499/11; H04N 7/181; G06V 20/10; G06K 9/6256
See application file for complete search history.

(56) References Cited

U.S. PATENT DOCUMENTS 7,552,030 B2 * 6/2009 Guralnik ............ G08B 21/0423
714/39
8,700,550 B1 * 4/2014 Bickford ................ G06N 20/00
706/14
(Continued)

FOREIGN PATENT DOCUMENTS

CN 107103362 A * 8/2017 ............. G06F 16/35
JP 2009-259156 11/2009
(Continued)

OTHER PUBLICATIONS

Sanjay Krishnan, "ActiveClean: Interactive Data Cleaning For Statistical Modeling", Proceedings of the VLDB Endowment, vol. 9, Issue 12, Aug. 2016, pp. 948-959 (Year: 2016).*
(Continued)

*Primary Examiner* — Tejal Gami
(74) *Attorney, Agent, or Firm* — Baker Botts L.L.P.

(57) ABSTRACT

In view of the relevant background art, the present invention is to provide a system or apparatus which enables data in use for learning to be sorted out, thereby reducing the amount of data to be handled. Presenting one example of the control system according to the present invention, the control system including a first processing device to generate a learnt model; and a second processing device to operate employing the generated learnt model and provided with input means, wherein the second processing device transmits information input from the input means to the first processing device; and where the input information as transmitted is information belonging to an area different from an area designated with the learnt model, the first processing device generates an updated learnt model based on the information belonging to the different area as received and the learnt model.

7 Claims, 10 Drawing Sheets

(51) Int. Cl.
*H04R 1/02* (2006.01)
*H04N 7/18* (2006.01)
*G06K 9/62* (2022.01)
*H04R 3/00* (2006.01)
*G06N 3/08* (2006.01)
*G06V 20/10* (2022.01)

(52) U.S. Cl.
CPC .............. *G06K 9/6256* (2013.01); *G06N 3/08* (2013.01); *G06V 20/10* (2022.01); *H04N 7/181* (2013.01); *H04R 3/00* (2013.01); *H04R 2499/11* (2013.01)

(56) References Cited

U.S. PATENT DOCUMENTS

| | | | | |
|---|---|---|---|---|
| 8,712,929 | B1* | 4/2014 | Bickford | G06Q 50/06 700/286 |
| 10,061,989 | B2 | 8/2018 | Kanna et al. | |
| 2014/0039834 | A1 | 2/2014 | Shibuya et al. | |
| 2014/0195184 | A1 | 7/2014 | Maeda et al. | |
| 2014/0365403 | A1* | 12/2014 | Demuth | G06N 20/00 706/11 |
| 2015/0199617 | A1 | 7/2015 | Kuwajima | |
| 2015/0379430 | A1* | 12/2015 | Dirac | G06N 20/00 706/12 |
| 2016/0055683 | A1* | 2/2016 | Liu | G07C 1/10 235/380 |
| 2017/0220407 | A1* | 8/2017 | Estrada | G06F 11/3495 |

FOREIGN PATENT DOCUMENTS

| | | |
|---|---|---|
| JP | 2010-055303 | 3/2010 |
| JP | 2012-164109 | 8/2012 |
| JP | 2013-041448 | 2/2013 |
| JP | 5301717 B | 6/2013 |
| JP | 2013-218725 | 10/2013 |
| JP | 2015-135552 A | 7/2015 |
| JP | 2016-191973 | 11/2016 |

OTHER PUBLICATIONS

Corresponding JP Office Action (JP2017-204158) dated Jan. 28, 2020 and its machine translation.
Corresponding JP Office Action (JP2017-20415 8) dated Jul. 14, 2020 and its machine translation.
JP2017-204158, Office Action dated Jan. 28, 2020 and Office Action dated Jul. 14, 2020.

* cited by examiner

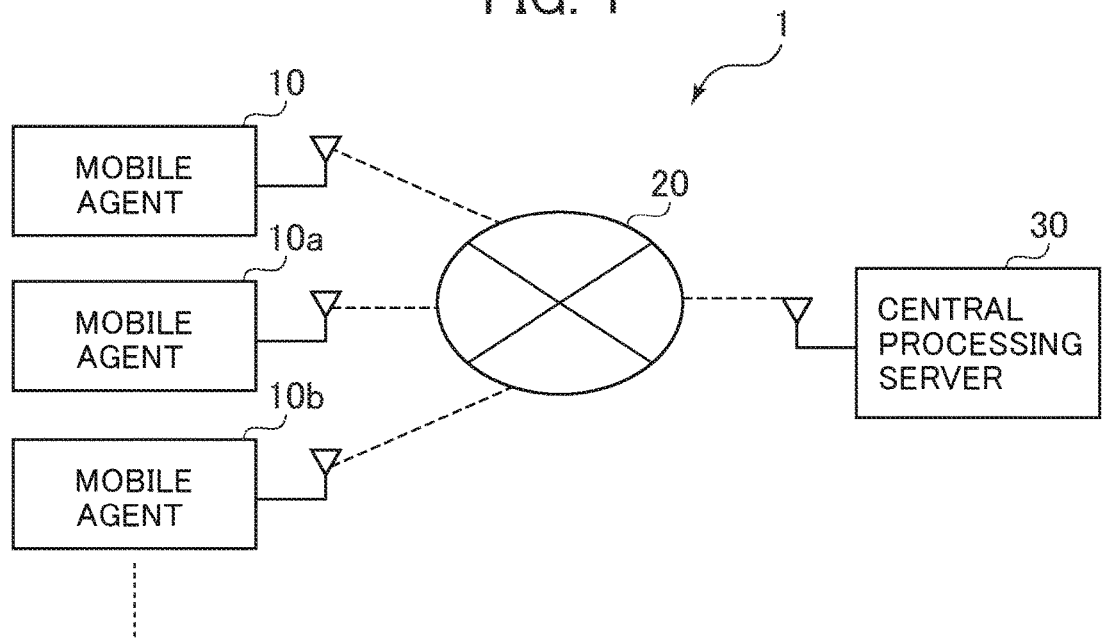
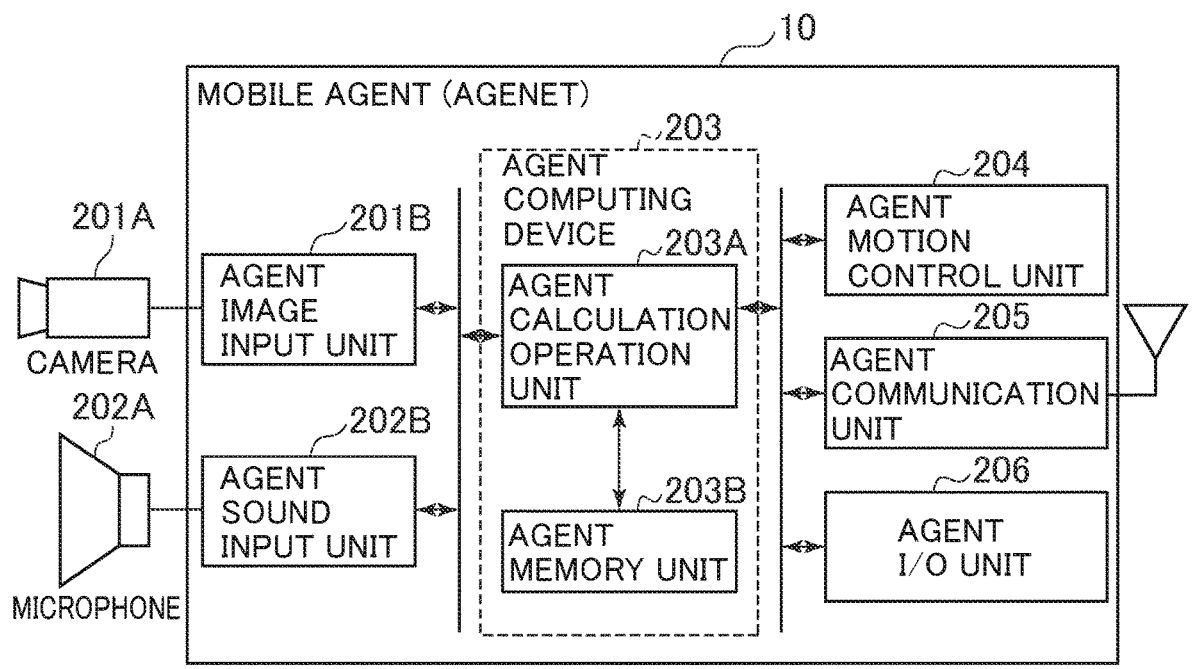

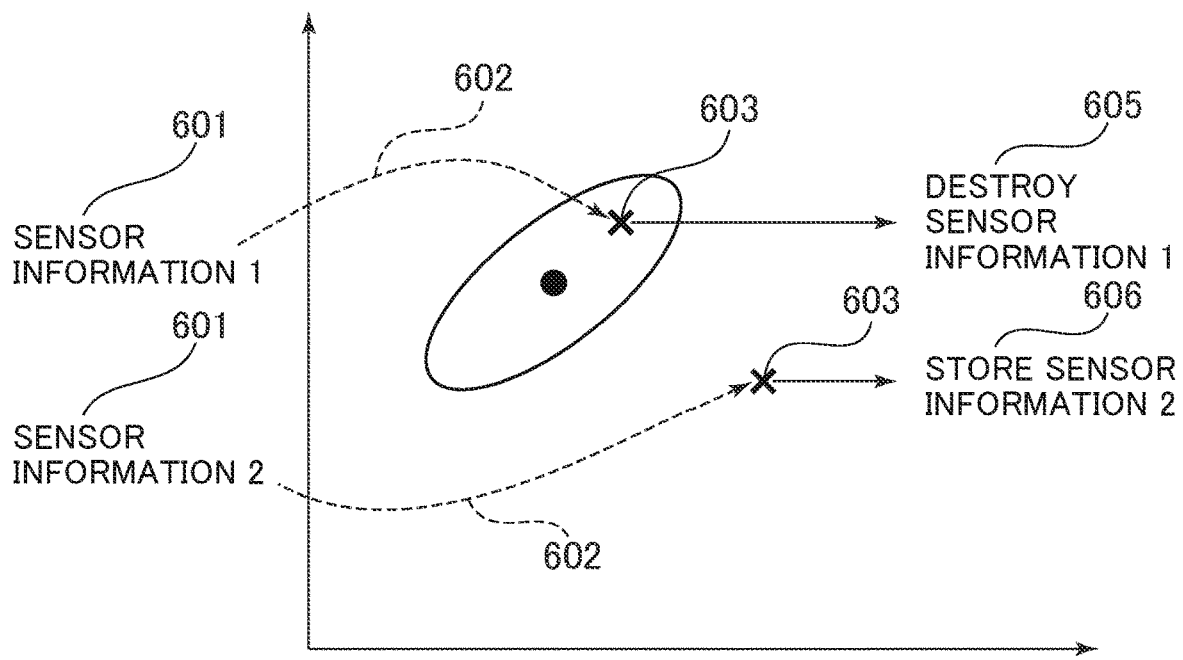
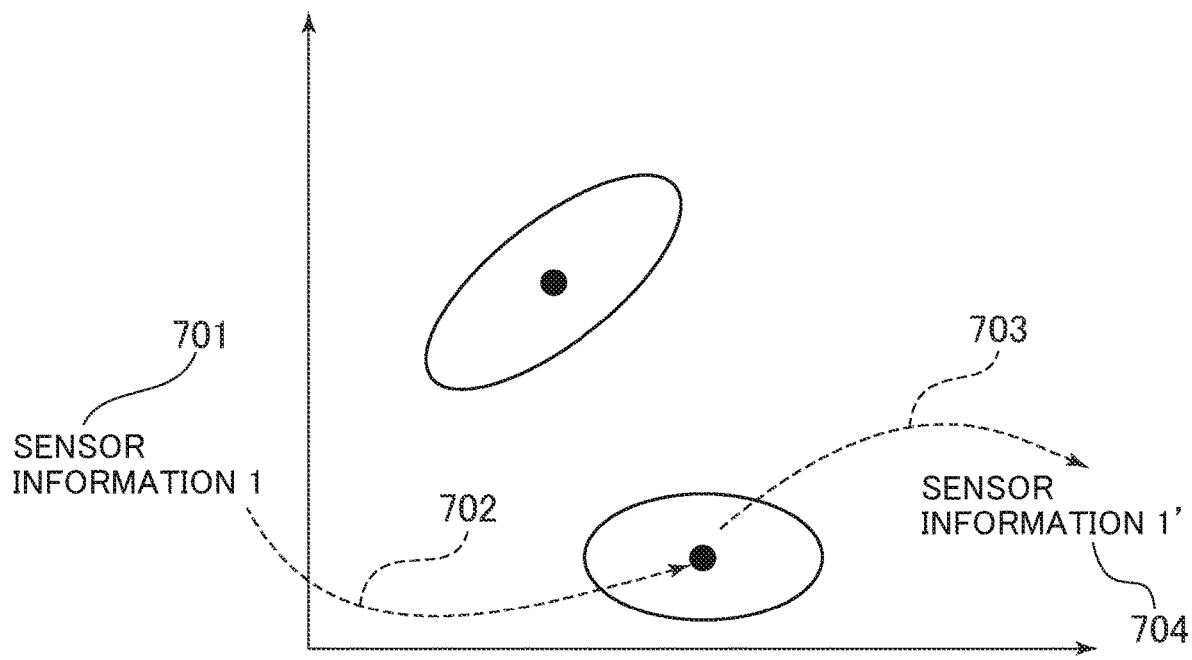

CONTROL SYSTEM AND CONTROL METHOD

CLAIM OF PRIORITY

The present application claims benefit of priority to Japanese Patent Application No. 2017-204158, filed on Oct. 23, 2017, the content of which is hereby incorporated by reference into this application.

TECHNICAL FIELD

The present invention relates to a control system for sorting out data.

BACKGROUND ART

In recent years, such a technique has been developed as information obtained from a plurality of IoT (i.e. Internet of Things) devices being processed at the central processing server and such information being subjected to machine learning.

In Patent Literature 1, there is disclosure in the abstract thereof on machine learning including the steps that 'upon 'on-board devices performing image recognition operation employing parameters stored in their memory units, they turn image data used for such image recognition operation into learning data so as to transmit such learning data to a learning server while upon a volume of learning data transmitted from the respective on-board devices being accumulated more than a prescribed threshold in the learning server, the learning server performs learning operation in terms of the image recognition operation based on the accumulated learning data so as to update the parameters (at Steps S205 and S215) and to provide the respective on-board devices with such updated parameters (at Step 220); then upon the on-board devices obtaining such updated parameters, they perform image recognition operation employing such updated data thereafter'.

CITATION LIST

Patent Literature

Patent Literature 1: Japanese Patent Unexamined Application Publication No. 2015-135552

SUMMARY OF INVENTION

Technical Problem

However, according to the disclosure of Patent Literature 1, it is required that data from a plurality of on-board devices be stored in a continuous manner, which leads to obliging e.g. such server to perform learning and storing operations with such on-board devices and other telecommunication equipment to handle a great amount of data, so that due attention is not paid to sorting out data into what is essential and what is non-essential so as to reduce the amount data to be handled.

In view of the above setback with the prior art, the present invention is to provide a system or apparatus which enables data in use for learning to be sorted out, thereby, the amount of data to be handled being reduced.

Solution to Problem

Presenting one example of the control system according to the present invention, the control system including a first processing device to generate a learnt model; and a second processing device to operate employing the generated learnt model and provided with input means is characterized in that the second processing device transmits information input from the input means to the first processing device; and where the input information as transmitted s information belonging to an area different from an area designated with the learnt model, the first processing device generates an updated learnt model based on the information belonging to the different area as received and the learnt model.

Advantageous Effects of Invention

The control system according to the present invention enables the amount of data to be handled to be reduced.

BRIEF DESCRIPTION OF DRAWINGS

FIG. 1 is a block diagram illustrating the arrangement of the learning system including a plurality of mobile agents according to the first embodiment.

FIG. 2 is a block diagram illustrating the system arrangement of the mobile agent according to the first embodiment.

FIG. 10 is a conceptual view illustrating the data sorting program according to the first embodiment.

FIG. 11 is a conceptual view illustrating the update processing of the data sorting model according to the first embodiment.

DESCRIPTION OF EMBODIMENTS

Figure 3:
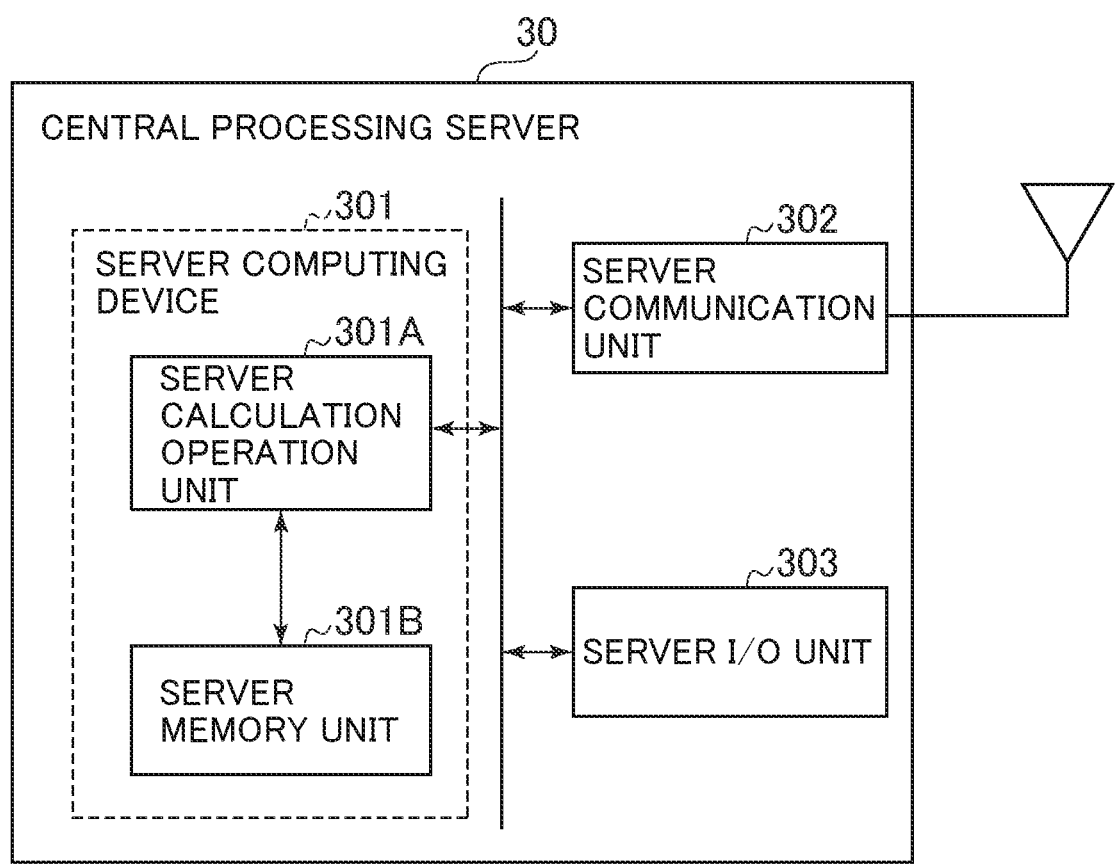
FIG. 3 is a block diagram illustrating the system arrangement of the central processing server according to the first embodiment.

Hereafter, the learning system embodied in the present invention is explained with reference to the accompanying drawings.

First Embodiment

The first embodiment of the present invention is explained with reference to the illustrations of FIGS. 1 to 11.

FIG. 1 is a block diagram illustrating the arrangement of a control system 1. To note, just because the following description is centered on the learning system, the control system 1 is also referred to as the learning system 1. In the learning system 1, a plurality of agents 10, 10a and 10b which is connected to a network 20 is illustrated.

Further, a central processing server 30 connected to the network 20 is illustrated. The network 20 may be wired or wireless. The agent 10 is a device provided with self-running means. The agent 10 is explained herein as a mobile agent 10 which independently operates with its surroundings and peripheral information input, but such agent may be such that it is not provided with self-running means.

In the latter case, it operates with its surroundings and peripheral information observed by itself around the place where it is disposed without self-running. For instance, it replies to the queries input according to human voices or by the input means employing information stored therein and the learnt models.

The control system according to the first embodiment is a so-called remote brain system. The agent 10 is capable of self-running, and the respective agents 10 independently moving with their surrounding conditions recognized act as mobile agents and share the role with the central processing server 30 which performs a high-level computing processing.

FIG. 2 is a block diagram illustrating the arrangement of the mobile agent 10. The mobile agent 10 includes a camera 201A to capture the images of its surroundings and a microphone 202A to capture the surrounding sounds and human voices; an agent computing device 203 to store information observed by the mobile agent 10 and to perform e.g. surrounding recognition operation, data sorting operation and local learning operation; an agent motion control unit 204 to make the mobile agent 10 independently move; an agent communication unit 205 to conduct communication; and an agent I/O unit 206 to conduct I/O with respect to the exterior.

The camera 201A which is an image capturing device is a so-called color camera in which image sensors capable of observing wavelengths within the range of visible light are two-dimensionally arrayed. The microphone 202A is a so-called dynamic microphone with a coil to sense vibration of sound waves which are audible to human ears. However, the microphone is not limited to such dynamic microphone, but may be any other means capable of detecting the sounds and human voices around the mobile agent 10.

The camera 201A may be a so-called monochromatic one which is incapable of capturing color information or a so-called depth one which is also capable of capturing depth information. The microphone 202A may capture information on sound waves through other systems or capacitor system and piezoelectric system, by way of some examples.

The camera 201A captures the images around the mobile agent 10 so as to output the captured images to an agent image input unit 201B. The camera 201A acquires the images around the mobile agent 10 by continuously capturing the images in the prescribed period e.g. in a 16.7 ms period (in the order of 60 fps). The images incorporated into the agent input unit 201B are input to the agent computing device 203 through a communication bus within the mobile agent 10 in the form of image sensor information. The period in which the images or videos are captured is not limited to a specific one, but on account that the control system according to the present invention allows the captured information to be sorted out (selected), so that it is preferred that such images or videos be captured in such a period as to secure the continuity to some extent.

Further, the microphone 201A converts the surrounding sound waves such as surrounding noises around the mobile agent 10 into digitalized signals so as to output such digitalized signals to an agent sound input unit 201B. The microphone 201B continuously captures the surrounding sound waves by converting sound wave signals into digitalized signals at the prescribed sampling frequency e.g. at the frequency of 44.1 KHz in a successive manner.

The digitalized signals incorporated into the agent sound input unit 202B are input to the agent computing device 203 through the communication bus within the mobile agent 10 in the form of sound sensor information.

The agent computing device 203, the agent image input unit 201B and the agent sound input unit 202B mutually transmit/receive information through the communication bus. The image sensor information and the sound sensor information which are input to the agent computing device 203 are hereinafter referred to as 'sensor information'.

The agent computing device 203 is of a well-known computer e.g. a PC including e.g. CPU, ROM, RAM, I/O and a bus interconnecting these components and governs/controls the mobile agent 10 according to a program stored in ROM or uploaded to RAM.

Further, the agent computing device 203 is provided with an agent calculation operation unit 203A and an agent memory unit 204B. The agent calculation operation unit 203A has such functions as recognizing the surrounding conditions based on the sensor information input to the agent computing device 203 and described later or storing such sensor information to be described later into the agent memory unit 203B according to the data sorting operation and determining whether or not such sensor information is transmitted to the central processing server 30.

The agent memory unit 203B stores the sensor information according to the result of the data sorting operation performed by the agent calculation operation unit 203A. The detailed explanation of the data sorting operation is given later. Further, the agent calculation operation unit 203A and the agent memory unit 203B mutually transmit/receive information.

The agent memory unit 203B may be used as ROM of the agent computing device 203. Further, an agent computing unit 203 may have a function other than noted above e.g. the function as to the local learning operation of a surrounding recognition model.

The agent motion control unit 204 is a unit which controls a device to make the mobile agent 10 independently move. The agent motion control unit 204 may be arranged, by way of one example, such that it measures the relative position or the absolute position of the mobile agent 10 in the actual surrounding employing a sensor not illustrated in the drawings to measure the surrounding of the mobile agent 10 and controls the motion mechanism composed of e.g. a motor and wheels so as to move the mobile agent to a destination.

To note, the motion mechanism is not limited to wheels, but may include e.g. a linear rail and a wire, in which any means to enable the mobile agent 10 to independently move may be adopted for such mechanism.

The agent communication unit 205 conducts communication with the central processing server 30 through the network 20. The agent communication unit 205 transmits sensor information which is obtained as the result of the data sorting operation performed at the agent calculation operation unit 203A and is to be intact to the central processing server 30.

Upon the agent communication unit 205 receiving a new data sorting model from the central processing server 30, it transmits such data sorting model to the agent computing device 203. Upon the agent computing device 203 receiving such data sorting model, it proceeds to update the data sorting models of the agent calculation operation unit 203A.

It is preferred that the agent I/O unit 206 include at least one of such I/O device with respect to the exterior as a key switch, a speaker to emit sounds and such a display device to display various types of information on the screen as a liquid crystal display.

Figure 8:
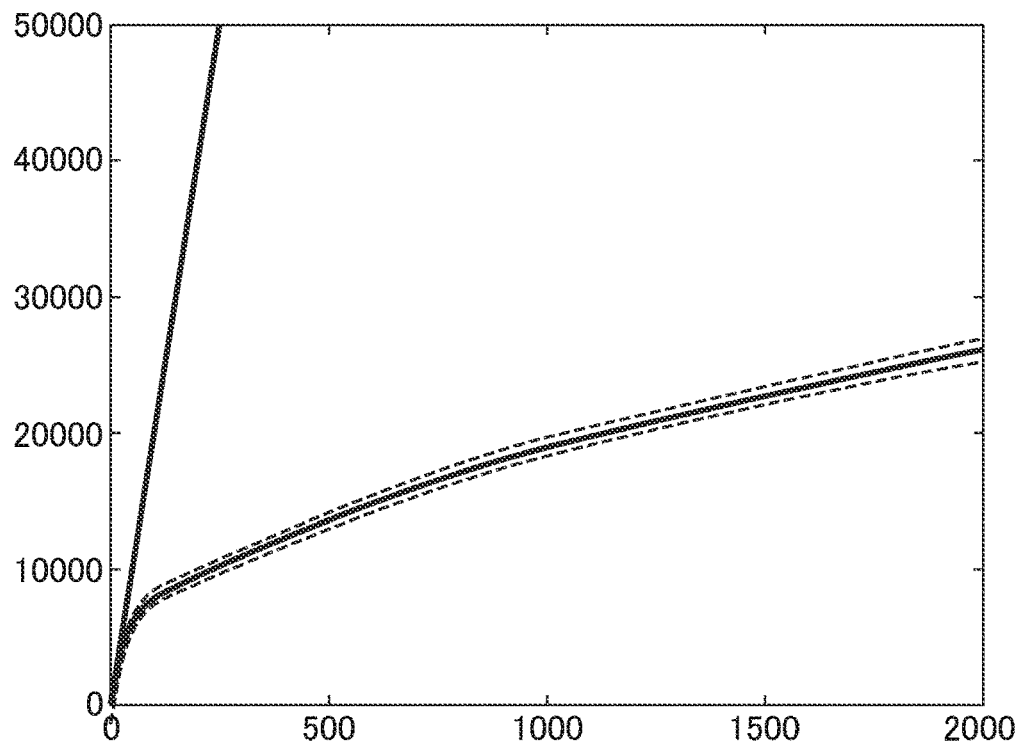
FIG. 8 illustrates a graph regarding the amount of data to be stored according to the first embodiment.
Figure 9:
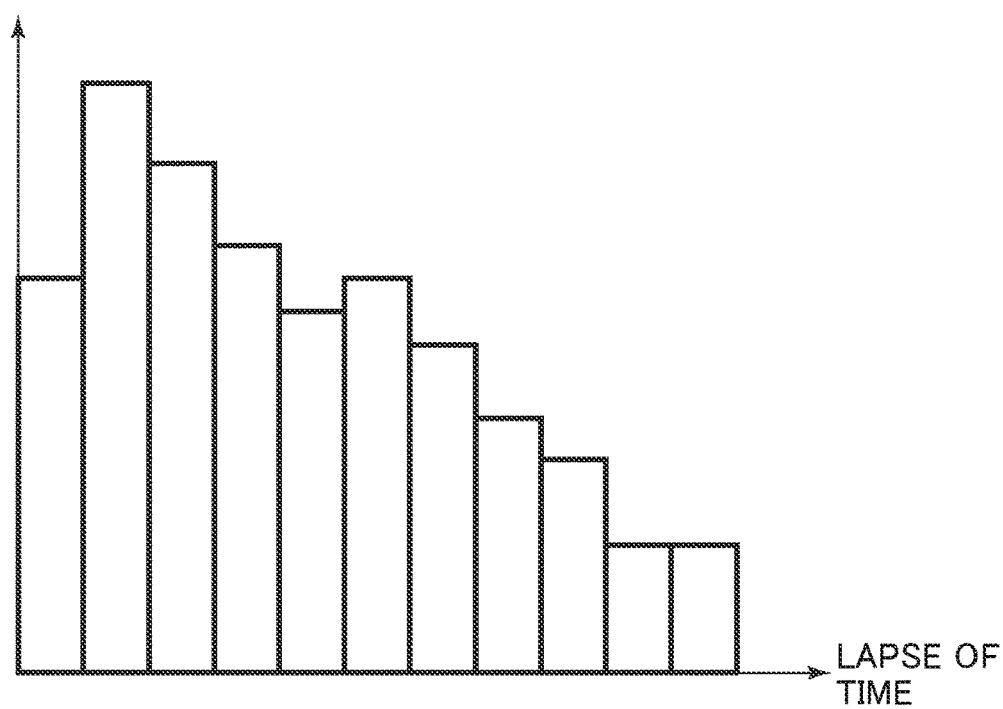
FIG. 9 illustrates a graph regarding the amount of data to be stored over each certain period of time according to the first embodiment.

Such graphs relating to the effect with which the amount of data to be stored is reduced may be visually displayed on the agent I/O unit 206 as the one illustrated in FIG. 8 regarding the total amount of data to be stored and the other illustrated in FIG. 9 regarding the amount of data to be stored over a certain period of time.

Such displaying operation as above allows the result of the data sorting operation to be visualized so that it enables an administrator to know what kind of data has been handled. Further, displaying the total amount of non-selected data and that of stored (selected) data allows such administrator to know how large data traffic is reduced.

Further, the communication conditions with the central processing server 30 e.g. the transmission condition of the sensor information and the reception condition of the data sorting model may be displayed on the screen. Such arrangement allows the administrator to confirm that the transmission of such sensor information and the reception of such data sorting model are conducted in a non-synchronous manner. For instance, it allows such administrator to confirm that the data sorting model is updated even when the mobile agent 10 placed in a location with a time lag is at a standstill.

In other words, it allows the data sorted out from data obtained by the mobile agent in use for e.g. an airport located in the first zone or the data sorting model reflecting such selected data to be updated even when the mobile agent in use for e.g. an airport located in the second zone is at a standstill.

FIG. 3 is a block diagram illustrating the arrangement of the central processing server 30. The central processing server 30 includes a server computing device 301 to store the sensor information transmitted from a plurality of mobile agents 10 and to perform e.g. the data sorting operation and the learning operation, a server communication unit 302 to conduct communication with the mobile agents 10 through the network 20, and a server I/O unit 303 to conduct I/O with respect to the exterior.

The server computing device 301 is of a well-known computer e.g. a PC including e.g. CPU, ROM, RAM, I/O and a bus interconnecting these components and determines the processing of the learning system 1 according to e.g. a program stored in ROM or uploaded to RAM.

Further, the server computing device 301 is provided with a server calculation operation unit 301A and a server memory unit 301B. The server calculation operation unit 301A has such functions as being described later or determining whether or not the sensor information described later is stored in the server memory unit 301B according to the data sorting operation and performing the learning operation of the data sorting model employing the sensor information stored in the server memory unit 301B.

The server memory unit 301B proceeds to store the sensor information according to the result of the data sorting operation performed at the calculation operation unit 301A. Further, the server calculation operation unit 301A and the server memory unit 301B mutually transmit/receive information. The server memory unit 301B may be used as ROM of the server computing device 301. Further, the server computing device 301 may have a function other than noted above e.g. a function as to the learning operation of a surrounding recognition model.

The server communication unit 302 conducts communication with the respective mobile agents 10 through the network 20. The server communication unit 302 transmits the data sorting model updated as the result of the learning operation of the data sorting model performed at the server calculation operation unit 301A to the respective mobile agents 10. Upon the server communication unit 302 receiving the sensor information from the respective mobile agents, it transmits such sensor information to the server computing device 301.

It is preferred that the server I/O unit 303 be provided with at least one of such an input device to be coupled to the central processing server 30 as a key board and a mouse and such a display device to display various types of information on the screen as a liquid crystal display.

Such graphs relating to the effect with which the amount of data to be stored is reduced may be visually displayed on the server I/O unit 303 in the same way as the agent I/O unit 206 as the one illustrated in FIG. 8 regarding the total amount of data to be stored and the other illustrated in FIG. 9 regarding the amount of data to be stored over a certain period of time. Further, the communication condition with the respective mobile agents 10 e.g. the reception condition of the sensor information or the transmission condition of the data sorting model may be displayed on the screen.

Explanation is given above on the system arrangement employing the central processing server 30, but both the mobile agent 10 and the central processing server 30 are not always required, in which where the processing capability of the computer integrated in the mobile agent 10 is high, it may be arranged in practice such that the central processing server 30 is integrated in the mobile agent 10.

In the case where the central processing server 30 is put to use, the computer integrated in the mobile agent 10 can be streamlined in structure compared with the case where the central processing server 30 is integrated in the mobile agent 10. Further, the functions of the central processing server 30 may be distributed into a plurality of mobile agents 10 in practice.

(Data Sorting Operation by Central Processing Server)

Figure 4:
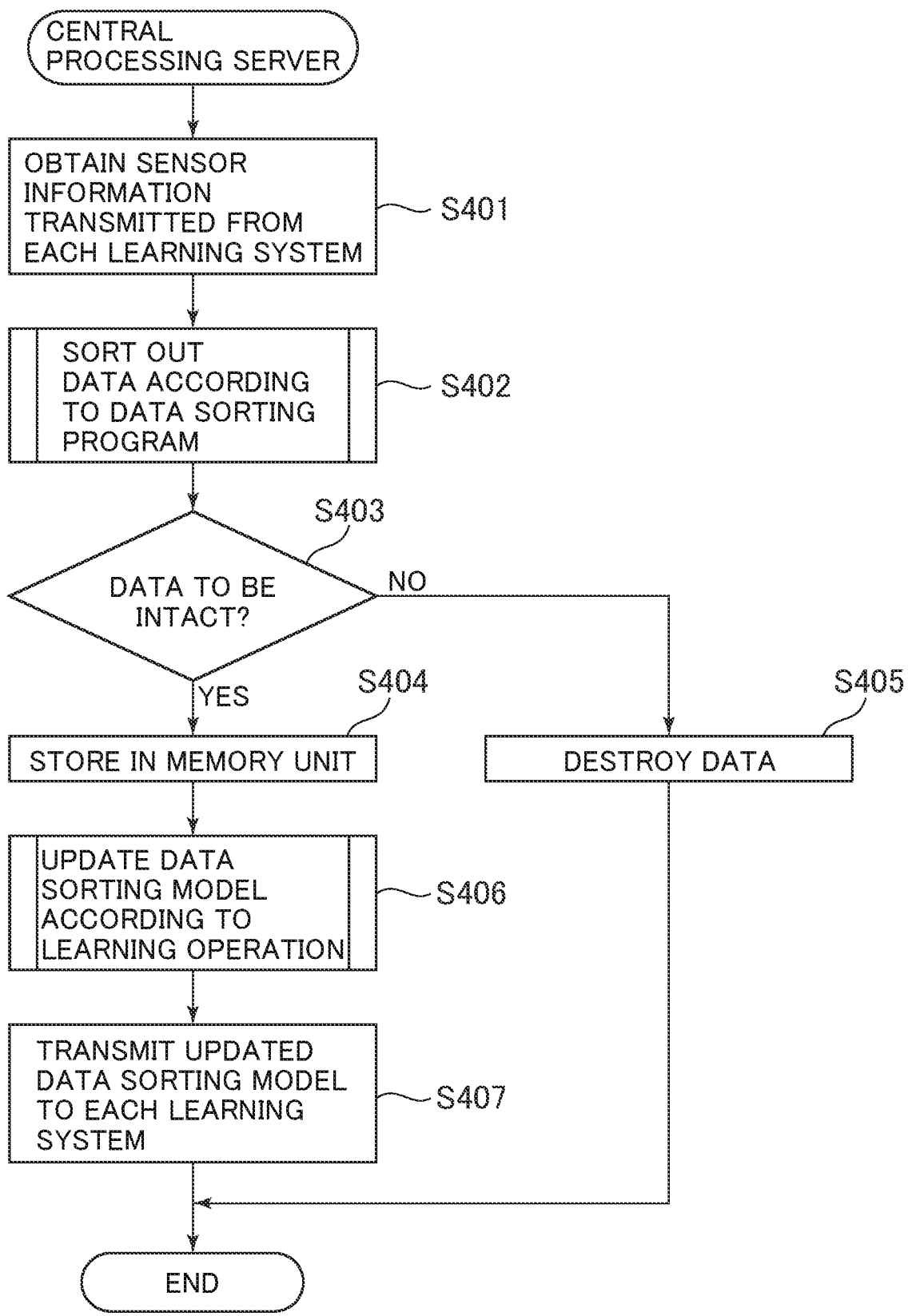
FIG. 4 is a flow chart illustrating the data sorting processing of the central processing server according to the first embodiment.

FIG. 4 illustrates a flow chart of the data sorting processing executed by the server computing device 301 of the central processing server 30. To note, the data sorting operation is carried out by the server computing device 301 in a successive manner. Successive manner referred to as herein denotes that such data sorting operation is repeatedly executed.

At Step S401, the server computing device 301 obtains the sensor information of the respective mobile agents 10 as received through the server communication unit 302. At the next Step S402, the server computing device determines whether the input sensor information is stored or destroyed based on a data sorting program and proceeds to the Step S403. Storing the sensor information is herein referred to as data sorting. To note, the detailed explanation of the data sorting program is given later with reference to FIG. 6.

At Step S403, in the case where the sensor information is stored, the server computing device proceeds to Step S404 whereas proceeding to Step S405 where such sensor information is destroyed.

At Step S404, the server computing device stores such sensor date in the server memory unit 301B and proceeds to Step S406. At Step S406, the server computing device updates a data sorting model through the learning operation employing the newly stored sensor information and proceeds to Step S407.

Figure 7:
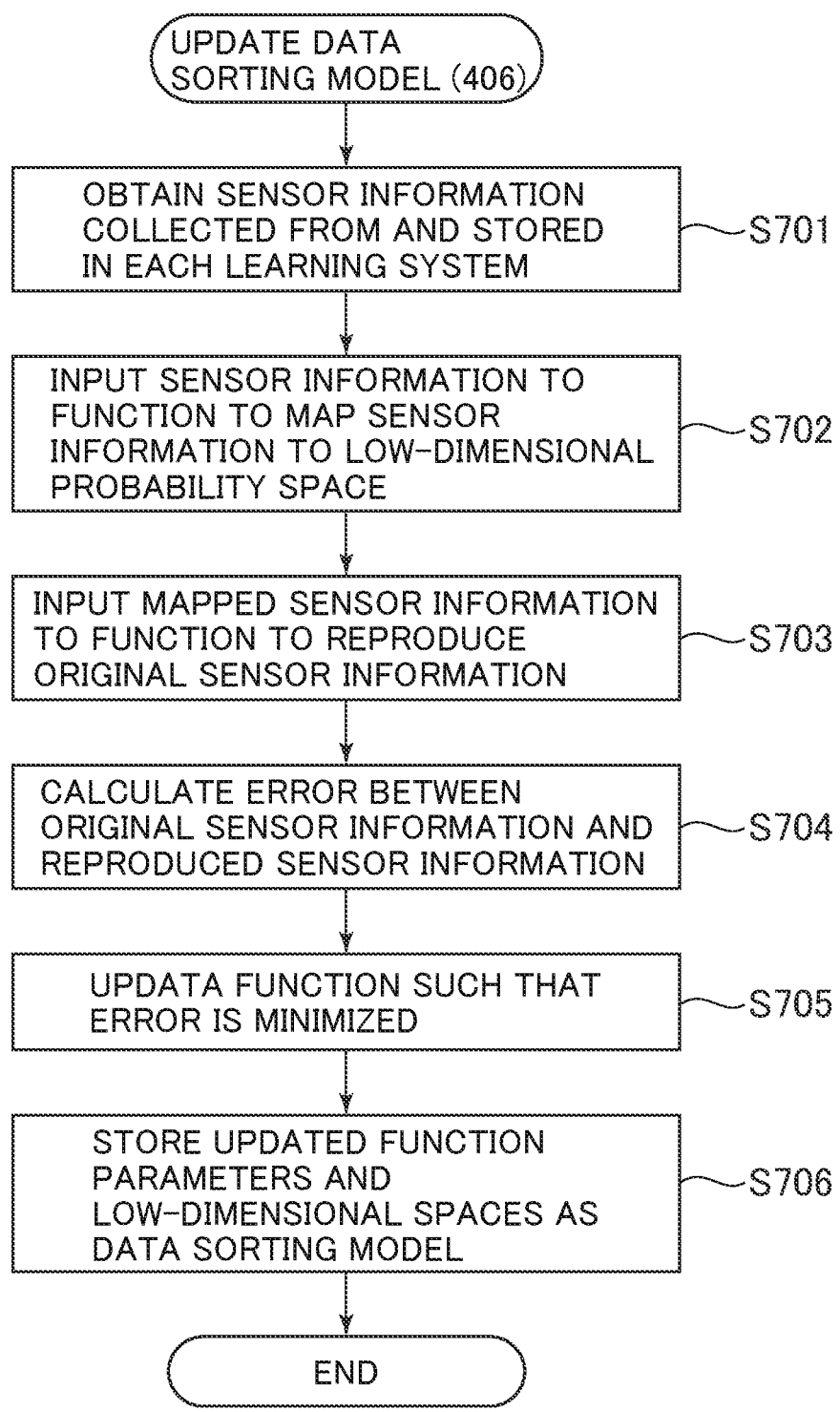
FIG. 7 is a flow chart illustrating the update processing of the data sorting model according to the first embodiment.

To note, the update processing method through the learning operation of the data sorting model will be described later with reference to FIG. 7. At Step S407, the server computing device transmits the updated data sorting model from the server communication unit 302 to the respective mobile agents 10 and ends the program.

At Step S405, the server computing device proceeds to delete such sensor information and ends the data sorting operation.

(Data Sorting Operation by Each Mobile Agent)

Figure 5:
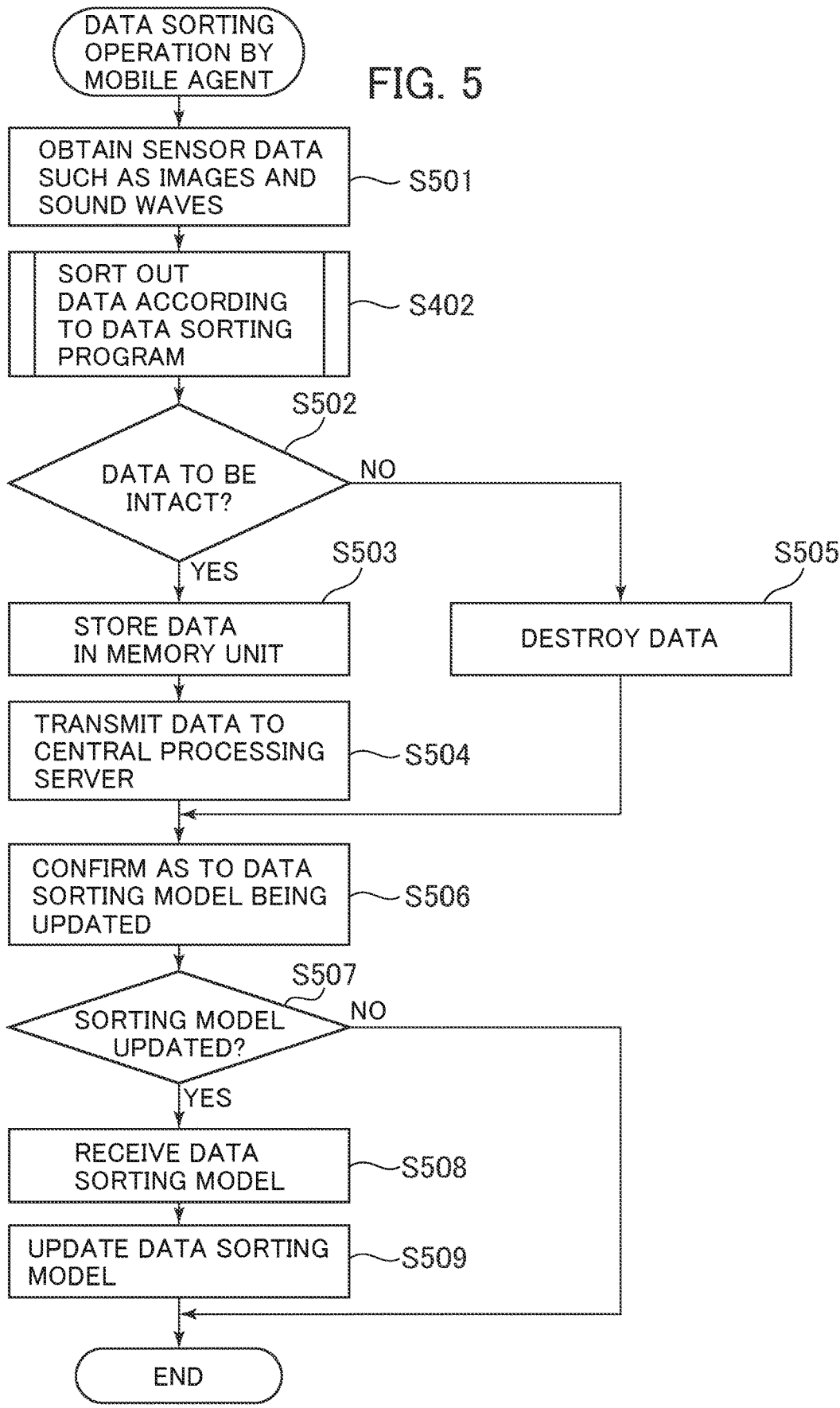
FIG. 5 is a flow chart illustrating the data sorting processing of the mobile agent according to the first embodiment.

FIG. 5 illustrates a flow chart of the data sorting operation performed by the agent computing device 203 of the mobile agent 10. To note, the data sorting operation is repeatedly executed at the agent computing device 203.

At Step S501, the agent computing device 203 obtains sensor information input from the agent image input unit 201B and the agent sound input unit 202B and proceeds to Step S402.

At Step S402, the agent computing device determines whether such sensor information is stored or destroyed based on a data sorting program and proceeds to Step S502. To note, the detailed explanation of the data sorting program is given later with reference to FIG. 6.

At Step S502, in the case where such sensor information is stored, the agent computing device proceeds to Step S503 whereas proceeding to Step S505 where such sensor information is destroyed. At Step S503, the agent computing device stores such sensor information in the agent memory unit 301B and proceeds to Step S504.

At Step S504, the agent computing device transmits such sensor information from the agent communication unit 205 to the central processing server 30 and proceeds to Step S506. At Step S505, the agent computing device deletes such sensor information and proceeds to Step S506.

At Step S506, the agent computing device conducts communication with the central processing server 30 at the agent communication unit 205, confirms the update of the data sorting model, and proceeds to Step S507. At Step S507, the agent computing device proceeds to Step S508 where the data sorting model is updated whereas it ends the program where such model is not updated.

At Step S508, the agent computing device conducts communication with the central processing server 30 at the agent communication unit 205, receives the data sorting model from the server, and proceeds to Step S509. At Step S509, the agent computing device updates the existing data sorting model by the data sorting model as received being written over the existing model and ends the program.

(Operation of Data Sorting Program 402)

Figure 6:
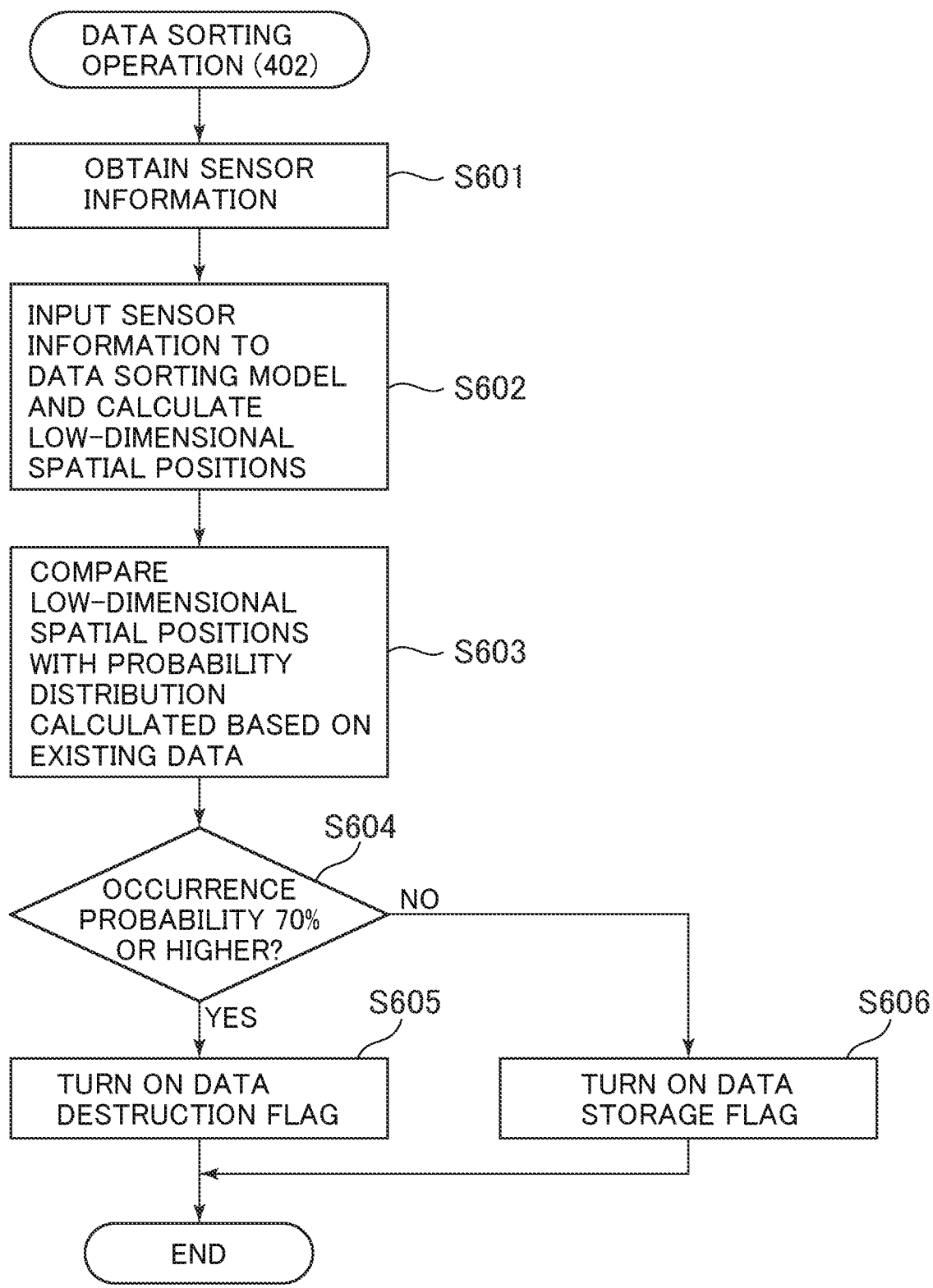
FIG. 6 is a flow chart illustrating the data sorting program according to the first embodiment.

FIG. 6 illustrates a flow chart of the data sorting program executed by the agent computing device 203 of the mobile agent 10 and the server computing device 301 of the central processing server 30. Further, the conceptual view of the data sorting program is illustrated in FIG. 10. The operation of the data sorting program 402 is explained with reference to the illustrations of FIGS. 6 and 10.

At Step S601, where the data sorting program is executed by the mobile agent 10, the corresponding computing device obtains the sensor information input from the agent image input unit 201B and the agent sound input unit 202B while the corresponding computing device obtains the sensor information of the respective mobile agents 10 as received through the server communication unit 302 where the data sorting program is executed by the central processing server 30, in either case the corresponding computing devices proceeding to Step S602. The procedure at Step S601 corresponds to the sensor information 601 illustrated in the conceptual view of FIG. 10.

At Step S602, the corresponding computing devices input such sensor information to the data sorting model, calculate low-dimensional spatial positions of such sensor information, and proceed to Step S603. The procedure at Step S602 corresponds to the dotted lines 602 illustrated in the conceptual view of FIG. 10.

Calculating the low-dimensional spatial positions referred to as herein denotes that the input sensor information is converted into probability distribution with the dimension of such sensor information lowered. For instance, where the image data is of the RGB three-dimensional data, the conversion into low-dimensional data referred to as herein denotes converting such three-dimensional data into one-dimensional data in which conversion is effected in terms of luminance. The data subjected to low-dimensional conversion is further converted into probability distribution. When the sensor information is concerned with voice data, such conversion is exemplified herein as the sampling rate being reduced. However, such conversion is not limited to the above examples, but the point is just that the originally input sensor information is converted into low-dimensional data.

To note, in order to enhance the efficiency of data processing, conversion is conducted several times, in which conversion into low-dimensional data is feasible even when the intermediate data subjected to conversion becomes higher-dimensional data than the input data.

At Step S603, the corresponding computing devices compare the low-dimensional spatial positions of the sensor information with the probability distribution calculated based on the existing sensor information so as to calculate the occurrence probability of such positions and to proceed to Step S604. Step S603 corresponds to 603 in the conceptual view of FIG. 10. The existing sensor information referred to as herein denotes the sensor information being used by the present data sorting model.

At Step S604, the corresponding computing devices proceed to Step S605 where such occurrence probability is 70% or higher whereas proceeding to Step S606 where it is below 70%. To note, such occurrence probability may take a value e.g. 50% or 90% other than the above 70%.

At Step S605, the corresponding computing devices turn on the destruction flag of the sensor information and end the program. Step S605 corresponds to 605 illustrated in FIG. 10. In other words, on account that the input sensor information in this case is already learnt, such input data is destroyed as unnecessary data, and the mobile agents 10 do not transmit such data to the central processing server 30 or the central processing server 30 deletes such data as unnecessary data, thereby, dispensing with storing such unnecessary sensor information or allowing the corresponding storage areas to be utilized more effectively.

At Step S606, the corresponding computing devices turn on the storage flag and end the program. The procedure at Step S606 corresponds to the reference sign 606 illustrated in FIG. 10. On account that the input sensor information in this case is necessary data for learning, such input sensor information is preserved or stored in the storage unit, and the mobile agents 10 transmit such input data to the central processing server 30 or the central processing server 30 preserves or stores such input sensor information as necessary data, thereby, allowing the sensor information necessary for learning to be intact with efficiency or such input sensor information to be effectively reflected on the learning model.

In other words, when the input sensor information belong to an area which is designated as the learnt model in low-dimensional space, such input sensor information is destroyed whereas when belonging to an area different from such designated area, such input sensor information is new, so that the learnt model is updated by such new data being reflected on or incorporated into the learnt model.

Further, in other words, when the transmitted sensor information is information belonging to an area different from that which is designated as the learnt model, an updated learnt model is generated based on the sensor information as received belonging to an area different from such designated area and the learnt model.

Such designated area and an area different therefrom can be shown on the display means. Concurrently, what kind of input sensor information is determined necessary or unnecessary can be shown thereon by displaying the low-dimensional spatial positions of such sensor information.

Further, when the input sensor information is information belonging to an area different from an area which is designated as the learnt model, it is feasible to transmit such input sensor information belonging to an area different from such designated area to other mobile agents 10 and the central processing server 30. Such exchange is feasible not only between the first mobile agent 10 and the second mobile agent 10, but also between the first mobile agent 10 and the central processing server 30.

The data sorting model in use for the present sorting program may be a function to map the sensor information to low-dimensional space e.g. polynomial function, hash function and neural network. Normal distribution may be adopted for the probability distribution to be calculated based on the existing sensor information, by way of one example.

(Operation of Update Processing 406 of Data Sorting Model)

FIG. 6 illustrates a flow chart of the update processing 406 of the data sorting model executed by the server computing device 301 of the central processing server 30. Further, the conceptual view of the update processing 406 of the data sorting model is illustrated in FIG. 11. The operation of the update processing of the data sorting model is explained as follows with reference to FIGS. 6 and 11.

At Step S701, the server computing device obtains the sensor information stored in the server memory unit 301B and proceeds to Step S702. The procedure at Step S701 corresponds to the sensor information 701 illustrated in FIG. 11. At Step S702, the server computing device converts respective sensor information into probability distribution in low-dimensional space employing a function and proceeds to Step S703.

The procedure at Step S702 corresponds to conversion 702 illustrated in FIG. 11. At Step S703, the server computing device reproduces the sensor information from the probability distribution employing a function distinct from that employed at Step S702.

The procedure at Step S703 corresponds to reproduction 703 illustrated in FIG. 11. At Step S704, the server computing device calculates an error between the sensor information stored in the server memory unit and the reproduced sensor information. The procedure at Step S704 corresponds to the calculation of an error between the reproduced sensor information 704 and the sensor information 701 illustrated in the conceptual view of FIG. 11. To note, it is recommended that such monotonic incremental function as square error be adopted for the calculation of such error.

At Step S705, the server computing device performs the learning operation of each function such that such error is minimized and proceeds to Step S706. To note, the well-known stochastic policy gradient method or least squares method may be adopted for the learning operation. At Step S706, the server computing device stores e.g. updated function parameters in the server memory unit 301B and ends the update processing.

According to the above-described first embodiment, the following operational effects are brought.

(1) With the learning system 1, the data is sorted out at a plurality of mobile agents 10 and the central processing server 30. Then, the data sorting model updated at the central processing server 30 is shared with the respective mobile agents 10, and the data sorting model is constantly updated. Therefore, the amount of sensor information which is stored in the agent memory units 203B of the respective mobile agents and the server memory unit 301B of the central processing server 30 respectively can be reduced, thereby, allowing cost incurred for storing such sensor information to be reduced.

(2) According to the data sorting model embodied in the present invention, the sensor information necessary for performing machine learning e.g. image recognition and motion learning can be preserved. Thus, machine learning operation can be realized with the same performance as in the prior art at the central processing server 30 based on a smaller amount of sorted-out sensor information which is preserved in the server memory unit 301B.

(3) Further, on account that machine learning processing is executed at the central processing server 30 based on a smaller amount of sorted-out sensor information, high-speed learning processing can be realized.

(4) With the respective mobile agents 10, it is supposed that they are placed in different locations. It is considered that difference in the optimal parameters applied for the learning operation such as motion generation occurs between the mobile agents 10 placed e.g. in an airport facility and a commercial facility. In the meantime, according to the present learning system, the sorted-out sensor information which is preserved in the agent memory units 203B of the respective mobile agents 10 can be put to use for the learning operation at the agent computing devices 203. On account that such learning operation is executed based on the reduced amount of sensor information, high-speed learning operation can be realized.

(5) Upon the respective mobile agents 10 transmitting the sensor information to the central processing server 30 through the network 20, they transmit thereto the sorted-out sensor information only. Thus, data traffic between them can be further reduced compared with the case where the entire sensor information is exchanged between them.

Modified Example 1

This example is such that the mobile agent 10 becomes free from a high-volume storage or free from the agent memory unit 203B acting as e.g. HDD and SSD. In other words, the sensor information sorted out at the mobile agent 10 is not preserved in its memory unit, but transmitted to the central processing server 30. In this case, the optimum parameters for each mobile agent 10 such as motion generation may be updated by central processing server.

In this modified example, the sorted-out sensor information is transmitted from the respective mobile agents 10 to the central processing server 30, but upon the central processing server 30 receiving such sensor information, it performs the above-described data sorting operation so as to determine sensor information to be destroyed and data to be reflected on the learning model with efficiency so that it can efficiently use its storage unit without preserving unnecessary data therein.

Further, it allows the central processing server to transmit the learning model updated employing necessary sensor information to each mobile agent without the need to transmit the entire sensor information thereto, so that the amount of sensor information to be transmitted to the respective mobile agents 10 can be minimized.

Modified Example 2

Regarding the data sorting operation illustrated in FIG. 4 and executed by the central processing server 30, the procedures at Steps 406 and 407 are not necessarily executed every time the sensor information is preserved, but may be executed at the expiration of a certain period of time e.g. per day, thereby, allowing the sensor information to be sorted out and the learning model to be updated with efficiency.

Modified Example 3

Regarding the sensor information sorting operation illustrated in FIG. 5 and executed by the mobile agent 10, the data transmission operation to the central processing server at Step 503 is not necessarily executed every time the new sensor information is obtained, but may be executed at the expiration of a certain period of time e.g. per day, thereby, allowing the sensor information to be sorted out and the learning model to be updated with efficiency.

Second Embodiment

Figure 12:
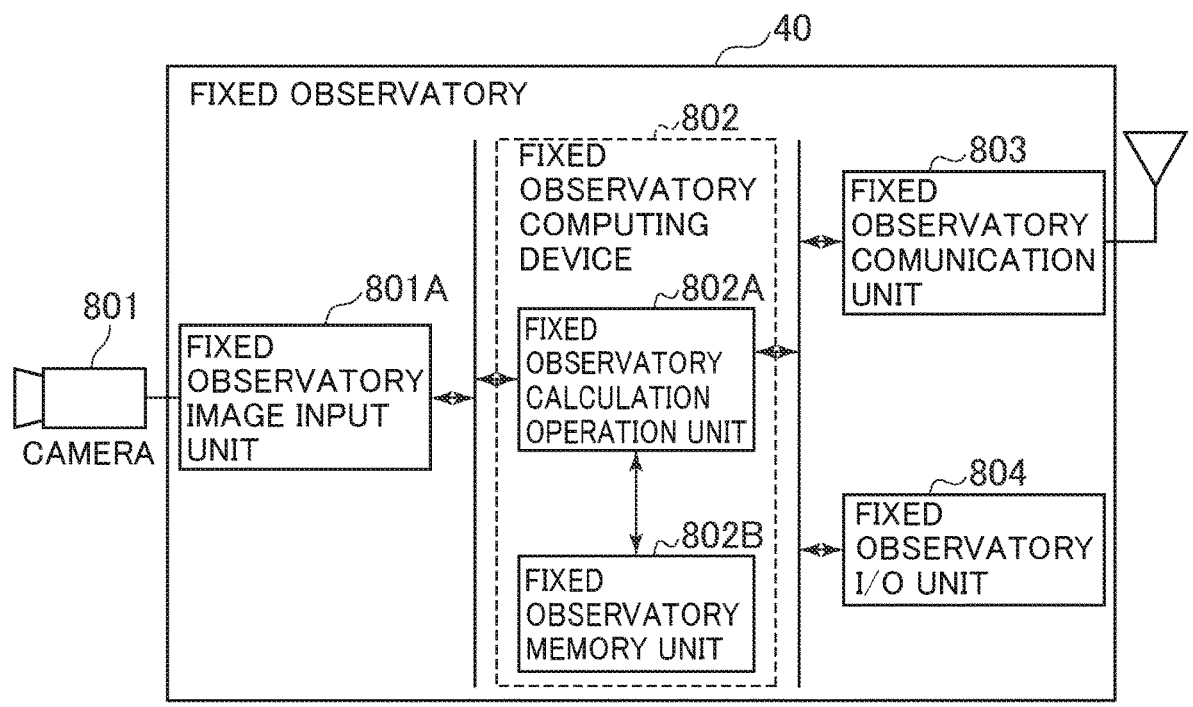
FIG. 12 is a block diagram illustrating the system arrangement of a fixed observatory according to the first embodiment.

With reference to FIG. 12, the second embodiment of the learning system is explained as follows. The following explanation is centered on the difference between the first and second embodiments with the same reference signs applied to the same structural features as the first embodiment. What is not explained in particular corresponds to the first embodiment. The difference between the first and second embodiments lies in that the agent is not mobile, but a fixed observatory e.g. a monitoring camera. In the same way as the mobile agents 10 illustrated in FIG. 1, the learning system 1 includes a plurality of fixed observatories 40.

FIG. 12 is a block diagram illustrating the arrangement of the fixed observatory 40. The fixed observatory 40 includes a camera 801 to capture the periphery of the fixed observatory 40, a computing device 802 to store information observed by the fixed observatory 40 and to perform surrounding recognition operation, sensor information sorting operation and local learning operation, a fixed observatory communication unit 830 to conduct communication, and a fixed observatory I/O unit 804 to conduct I/O with respect to the exterior.

It is a calculation operation unit 802A of the fixed observatory computing device 802 that performs the sensor information sorting operation based on the sensor information derived from the digitalized images observed by the camera 801 of the fixed observatory 40 and obtained by a fixed observatory image input unit 801A. Then, the sorted-out sensor information is transmitted to the central processing server 30 through the network 20. The updated data sorting model is transmitted from the central processing server 30 to the respective fixed observatories 40 through the network 20.

The above-described embodiment also brings the same operational effects as the first embodiment.

Third Embodiment

Figure 13:
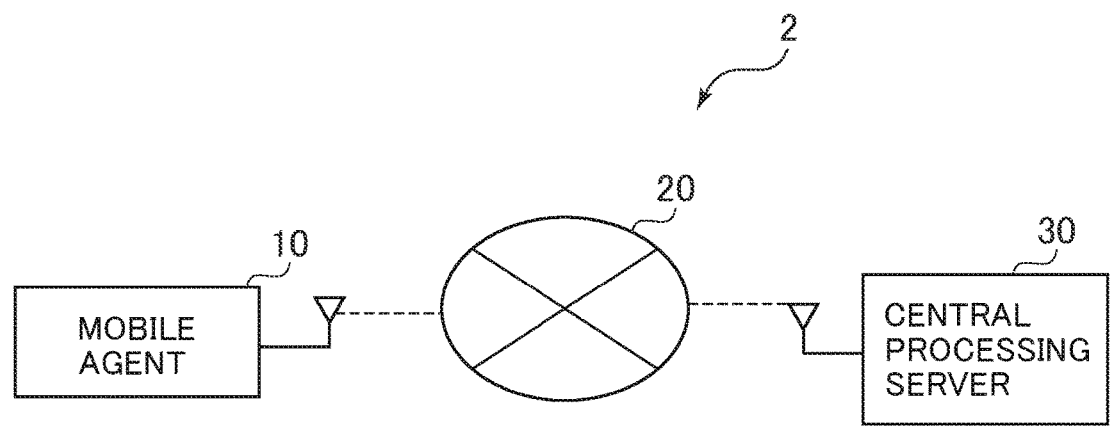
FIG. 13 is a block diagram illustrating the arrangement of the learning system including a single mobile agent according to the first embodiment.

With reference to FIG. 13, the third embodiment of the learning system is explained as follows. The following explanation is centered on the difference between the first and third embodiments with the same reference signs applied to the same structural features as the first embodiment. What is not explained in particular corresponds to the first embodiment. The difference with the first embodiment lies in that the number of agents is not in plurality, but single.

FIG. 13 is a block diagram illustrating the arrangement of the learning system 2. The learning system 2 includes the single mobile agent 10 and the central processing server 30 coupled to the mobile agent through the network 20.

The above-described embodiment also brings the same operational effects as the first embodiment.

Fourth Embodiment

Figure 14:
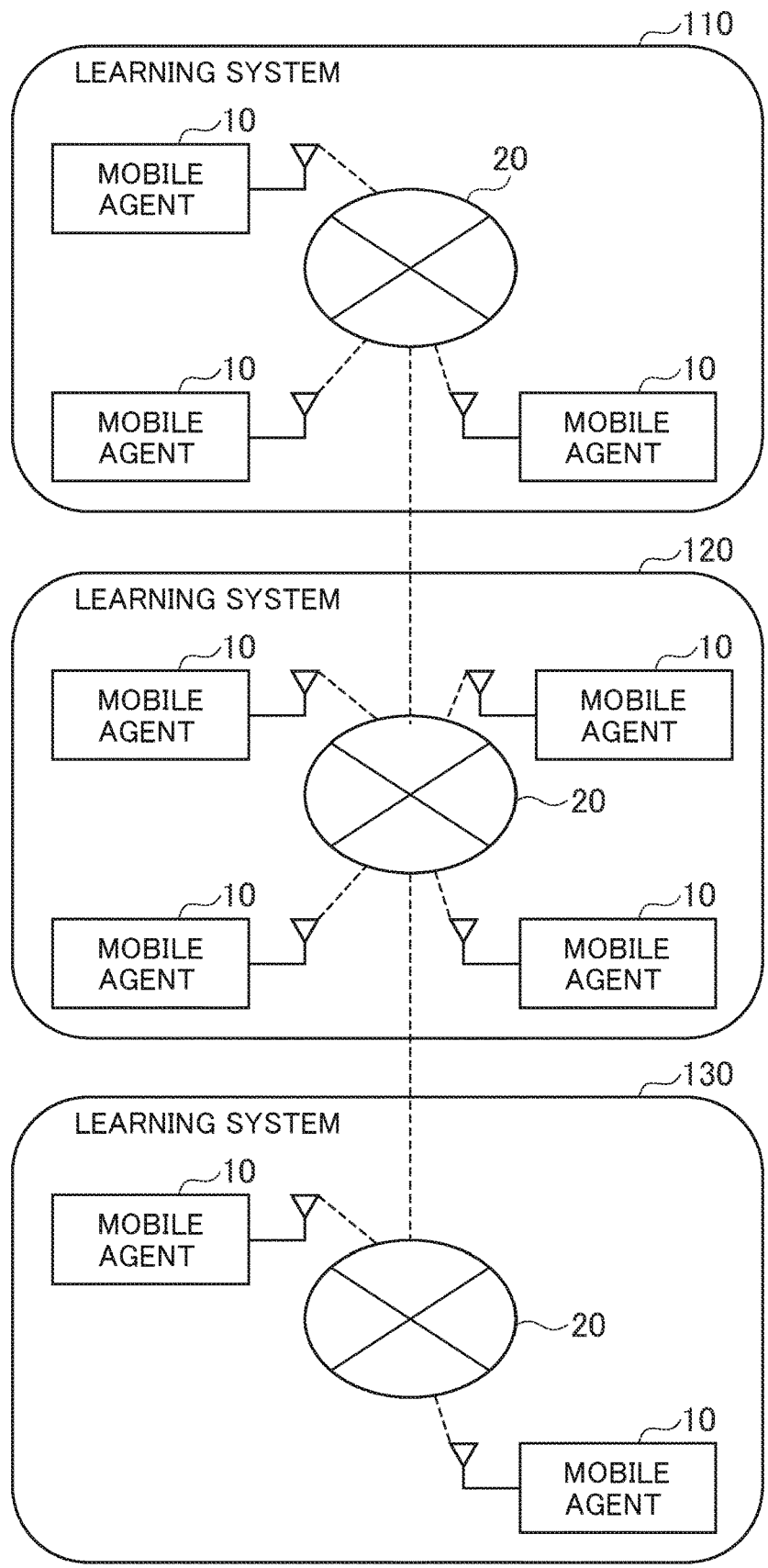
FIG. 14 is a block diagram illustrating the system arrangement including a plurality of learning systems according to the first embodiment.

With reference to FIG. 14, the fourth embodiment of the learning system is explained as follows. The following explanation is centered on the difference with the first embodiment with the same reference signs applied to the same structural features as the first embodiment. What is not explained in particular corresponds to the first embodiment. The difference with the first embodiment lies in that the present embodiment is composed not of the single learning system, but of a plurality of learning systems.

FIG. 14 is a block diagram illustrating the arrangement learning systems in plurality. The learning systems 110, 120 and 130 respectively include a plurality of mobile agents 10 and the network 20 interconnecting the respective mobile agents 10. The learning systems 110 and 120 are coupled to each other through the networks 20 within the respective systems. The respective learning systems are capable of obtaining different sensor information. For instance, providing that the learning system 110 includes a group of mobile agents 10 disposed within a commercial facility and the learning system 120 includes a group of mobile agents 10 disposed within an airport facility, such systems are capable of obtaining different sensor information from each other. According to the present learning systems, the operations executed by the central processing server 30 may be transferred to the respective mobile agents 10 or the role of the central processing server 30 may be played by the specific mobile agents 10. Further, the number of mobile agents 10 included in the respective learning systems is not necessarily the same to each other.

According to the above arrangement, upon newly constructing the learning system 130, it allows image recognition model, conversation model and data sorting model to be subjected to the learning operation employing the sensor information of the learning systems 110 and 120 which are preliminarily operated and have such sensor information sorted out and stored.

The present embodiment brings the following operational effects in addition to the same ones as the first embodiment.

(6) Upon newly constructing the learning system 130, the learning operation is executed employing only a smaller amount of sensor information preliminarily sorted out. Thus, such learning operation for the newly constructed learning system 130 can be completed with high speed.

Further, with respect to the above-described low-dimensional spatial positions, the sensor information can be shown on the display means inclusive of the low-dimensional spatial positions of such sensor information as illustrated in FIG. 10 or FIG. 11. In this case, making the sensor information which is determined necessary or unnecessary retained or stored for a certain period of time and showing such sensor information on the display means allows e.g. an administrator to be in the position of confirming what kind of data is processed by the mobile agent 10 or the central processing server 30.

By displaying the relation between the sensor information and the occurrence probability explained at Step S604 with reference to the flow chart illustrated in FIG. 6, it allows the sensor information which is determined unnecessary but desirable to be incorporated into the learning model to be optionally stored. Further, even such sensor information as having been determined necessary can be modified as unnecessary ones according to the judgment of e.g. an administrator.

By displaying the sensor information corresponding to a certain period of time, it allows e.g. an administrator to know what kind of sensor information is input to the mobile agent 10 while by modifying such occurrence probability, it permits the data sorting operation to be executed with efficiency.

The present invention is not limited to the above-described embodiments. The other embodiments to be pondered within the technical scope of the present invention also belong to the present invention as claimed.

LIST OF REFERENCE SIGNS 1 learning system
10 mobile agent
20 network
30 central processing server
201A camera
201A agent image processing device
202 microphone
202B agent sound input unit
203 agent computing device
203A agent calculation operation unit
203B agent memory unit
204 agent motion control unit
205 agent communication unit
206 agent I/O unit
301 server computing device
301A server calculation operation unit
301B server memory unit
302 server communication unit
303 server I/O unit
801 camera
802 fixed observatory computing device
802A fixed observatory calculation operation unit
802B fixed observatory memory unit
803 fixed observatory communication unit
804 fixed observatory I/O unit

The invention claimed is:

1. A control system comprising: a first processing device to generate a learnt data sorting model; and a second processing device to execute a data sorting operation by employing the generated learnt data sorting model,
wherein the second processing device includes an input means, and a memory containing a plurality of storage areas including a designated storage area, the second processing device configured to:
receive a data sorting model generated by the first processing device and store the data sorting model in the designated storage area;
receive input information from the input means;
input the input information from the input means into the data sorting model;
calculate an occurrence probability for the input information, wherein the occurrence probability corresponds to the likelihood that the input information corresponds to data stored in the designated storage area;
determine whether the occurrence probability exceeds a predetermined occurrence probability threshold;
destroy input information exceeding the predetermined occurrence probability threshold; and
transmit any remaining input information to the first processing device,
where wherein the input information as transmitted is information belonging to a storage area different from the designated storage area, and wherein the first processing device generates an updated learnt data sorting model based on the received input information.

2. The control system according to claim 1,
wherein when the input information belongs to a storage area different from the designated storage area, the second processing device transmits the information belonging to the different storage area to the first processing device.

3. The control system according to claim 1,
wherein the first processing device transmits the updated learnt data sorting model to the second processing device; and
the second processing device performs certain operations employing the updated learnt data sorting model as received.

4. The control system according to claim 1 further comprising a third processing device,
wherein the first processing device transmits the updated learnt data sorting model to the third processing device; and
the third processing device performs certain operations employing the updated learnt data sorting model as received.

5. The control system according to claim 4,
wherein the third processing device is provided with display means showing reception of the updated learnt data sorting model upon receiving it.

6. The control system according to claim 1 comprising display means for showing a data traffic of the input information transmitted by the second processing device and a data traffic by which the updated learnt data sorting model is transmitted by the first processing device.

7. The control system according to claim 1 comprising display means for showing the input information as received by the first processing device, which is information belonging to a storage area different from the designated storage area.

* * * * *